United States Patent

[11] 3,624,285

[72] Inventor Hanns H. Wolff
Orlando, Fla.
[21] Appl. No. 753,269
[22] Filed Aug. 16, 1968
[45] Patented Nov. 30, 1971
[73] Assignee The United States of America as represented by the Secretary of the Navy

[54] HIGH-RESOLUTION TELEVISION SYSTEM
4 Claims, 7 Drawing Figs.

[52] U.S. Cl. .......... 178/6.8, 315/18
[51] Int. Cl. .......... H04n 5/30
[50] Field of Search .......... 178/6.5, 6.8, 5.2; 315/18, 25, 26

[56] References Cited

UNITED STATES PATENTS

| | | | |
|---|---|---|---|
| 2,083,203 | 6/1937 | Schlesinger .......... | 315/25 |
| 2,703,339 | 3/1955 | Goldsmith .......... | 178/5.2 |
| 3,089,917 | 5/1963 | Fernicola .......... | 178/6.5 |
| 3,457,365 | 7/1969 | Stokes .......... | 178/6.8 |
| 2,603,706 | 7/1952 | Sleeper .......... | 178/5.4 |

FOREIGN PATENTS

| | | | |
|---|---|---|---|
| 226,430 | 11/1957 | Australia .......... | 178/6.5 |

*Primary Examiner*—Benedict V. Safourek
*Assistant Examiner*—Joseph A. Orsino, Jr.
*Attorneys*—Joseph C. Warfield, John W. Pease and John F. Miller

ABSTRACT: To increase resolution in a television system, a plurality of television cameras are positioned to view a common scene and to furnish video information to a common display tube which has a like plurality of electron gun systems and beam deflecting means to control each electron beam individually. Brightness is increased proportionately. Beam deflection voltages (or currents) in the display tube and in the cameras are synchronized but differ in amplitude and/or phase so that scanning lines associated with different cameras are interspaced on the display tube screen.

INVENTOR.
Hanns H. Wolff
BY John F. Miller Agent
John M. Perry
Attorney

PATENTED NOV 30 1971 3,624,285

INVENTOR.
Hanns H. Wolff
BY John F. Miller Agent
John W. Pease
Attorney

INVENTOR.
Hanns H. Wolff
BY John T. Miller Agent
John M. Perry Attorney

HIGH-RESOLUTION TELEVISION SYSTEM

The inventor's copending application, Ser. No. 733,036, filed May 29, 1968, now U.S. Pat. 3,542,951 shows certain circuits herein in detail.

BACKGROUND OF THE INVENTION

The invention is in the field of television systems. A basic problem in television has been insufficient resolution to present a picture showing the scene viewed by the television cameras in sufficient detail. Efforts to obtain better resolution have heretofore attained only limited success.

SUMMARY OF THE INVENTION

The invention employs two or more cameras with a multi gun, multideflection means display tube to obtain superior resolution in a television system by putting more video information on the display tube screen. The system employs a common pulse generator to synchronize the cameras, the gun systems, and the deflection means. Means are provided to cause the deflection voltages (or currents) for the different gun systems to differ in amplitude and/or phase so that the respective beams of the several gun systems simultaneously scan different parts of the display tube screen in a pattern of interspaced lines. That is, the scanning lines traced by a particular beam are evenly interlaced among the scanning lines traced by the other beam or beams. Since each of the beams is scanning a different part of the screen at any given instant, interference between beams is avoided.

FIG. *4a*shows an alternate arrangement of frame sweep deflection voltages or currents.

FIG. *4b*shows another alternate arrangement of frame sweep deflection voltages or currents.

Figure 5:
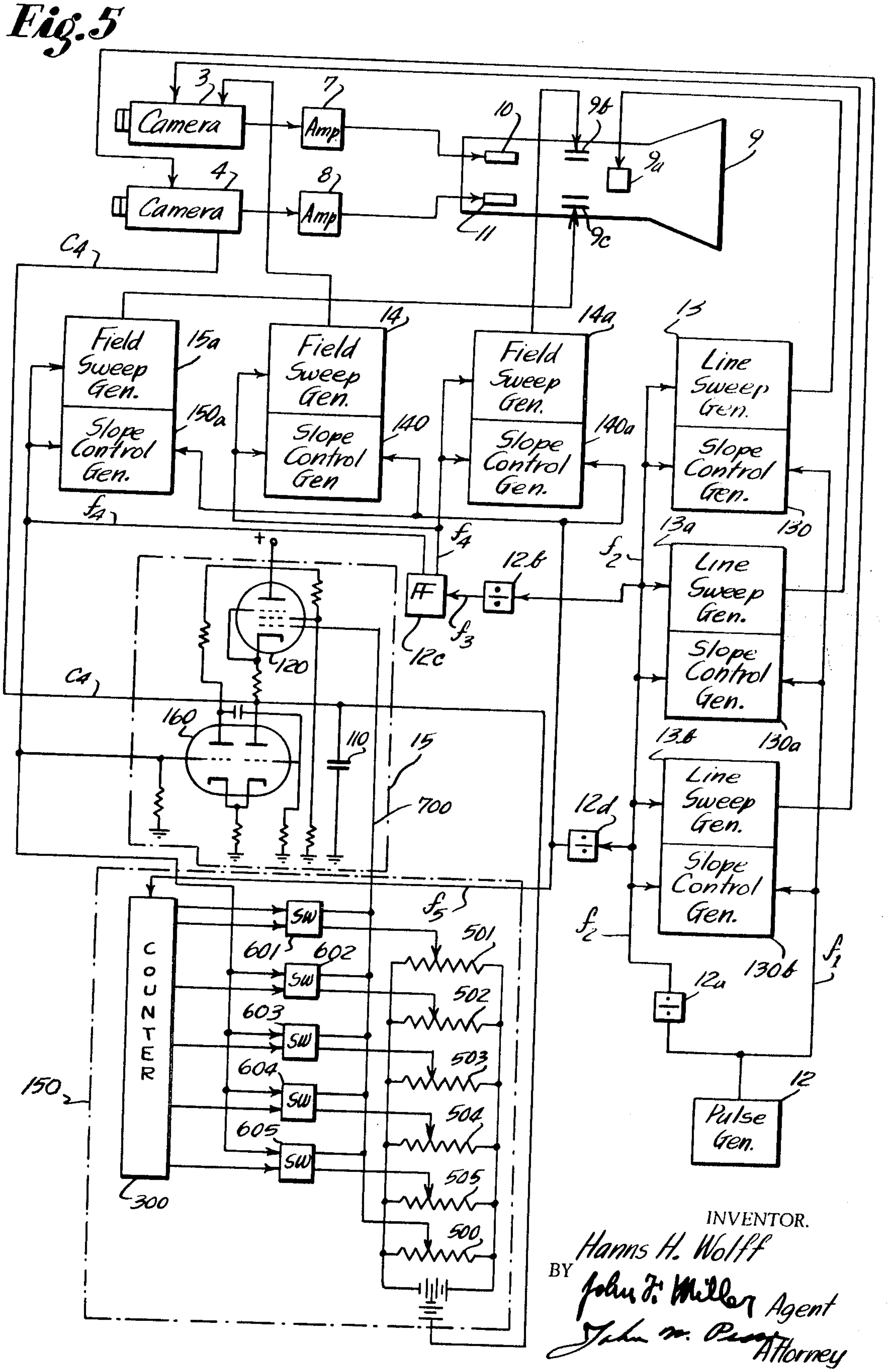

FIG. 5 shows one embodiment of the invention.

DESCRIPTION OF THE PREFERRED EMBODIMENT

There exists a need for high-resolution-television (TV) systems both for closed circuit TV as well as for long distance TV (by cable or by carrier), which will give a resolution that is compatible with the capabilities of the human eye.

Several factors are limiting the resolution to the present day systems. On one hand the capability of the eye to follow moving objects and the avoidance of the flicker effect set a limit to the minimum frame or field rate. On the other hand, the number of frame lines and compatible resolution along the line is limited by the band width in the video chain between the camera and the display system.

The system proposed and described in the following will increase the effective resolution and brightness without requiring a very wide bandwidth for the video amplifiers of the system.

The proposed system consists of two or more TV channels each of which displays and controls a respective raster which is displaced with respect to the other or others on the display tube.

For this purpose a two channel system, for example, would consist of two pickup cameras that are looking at the same scene and with a scanning system in which two line scans are displaced with respect to each other. Each camera is associated with its own video amplifier and controls one of two beam systems writing on a common display tube screen.

Figure 1:
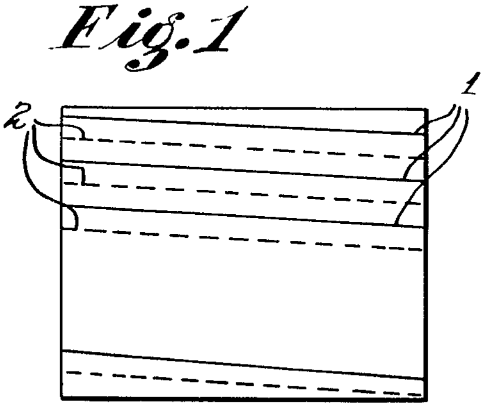
FIG. 1 shows a pattern of interlaced scanning lines on the screen of a television display tube.
Figure 3:
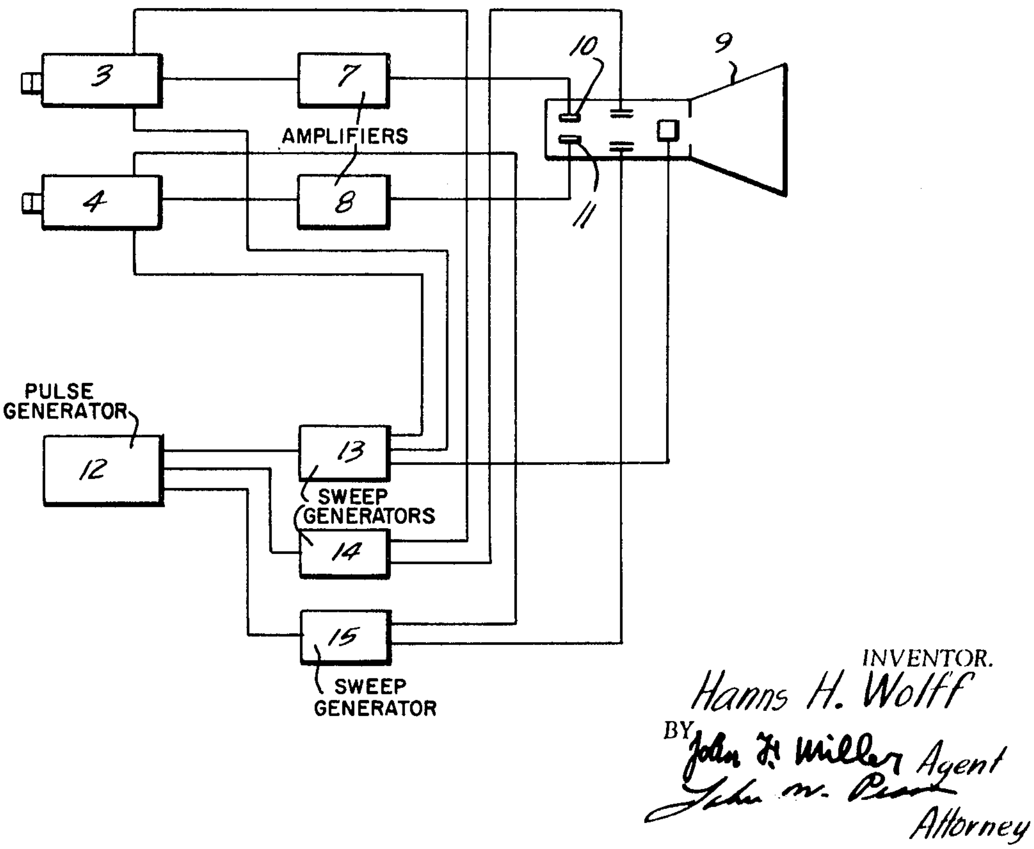
FIG. 3 shows the arrangement of the principal elements of the invention.

FIG. 1 shows the arrangement of the raster on the common display tube screen, raster 1 being written by a gun system 10, raster 2 being written by a gun system 11 of a display tube 9, which is shown in FIG. 3.

Figure 2:
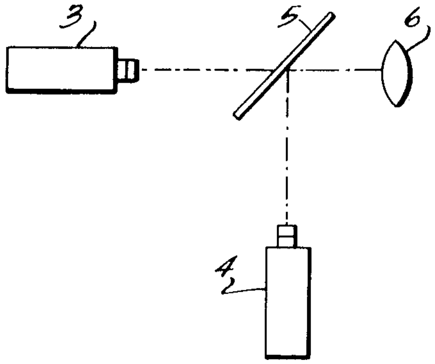
FIG. 2 shows on possible arrangement of cameras.

The signals, as mentioned before, originate from two cameras, 3 and 4, which can be arranged either side-by-side or if close by objects have to be televised, in a manner as shown in FIG. 2, where the cameras 3 and 4 are looking at the same scene through a beam splitter 5 and lens system 6. Instead of using two separate cameras a camera with a two gun pickup system could be used.

FIG. 3 shows the overall system. Camera 3 generates a video signal that is amplified in the video amplifier 7 to control gun system 10 of the display tube 9. Camera 4 generates a video signal that is amplified by video amplifier 8 and controls gun system 11 of the display tube 9. A pulse generator 12 generates line pulses that control a line sweep generator 13 which generates line sweep voltages or currents for the camera 3, camera 4, and the display tube 9. The pulse generator 12 also produces field signals which control the generation of field sweep voltages or currents in the field sweep generators 14 and 15. These in turn determine the field sweeps for the gun system 10 and 11 and cameras 3 and 4.

The two rasters which are displaced with respect to each other as shown in FIG. 1 require field sweep voltages (or currents) in the display tube deflection circuits differing in amplitude and/or phase by an amount causing one-half a line width of beam displacement so that the raster lines generated by one gun system are placed between the raster lines generated by the other gun system and correspondingly, of course, also the respective camera scan lines.

Figure 4:
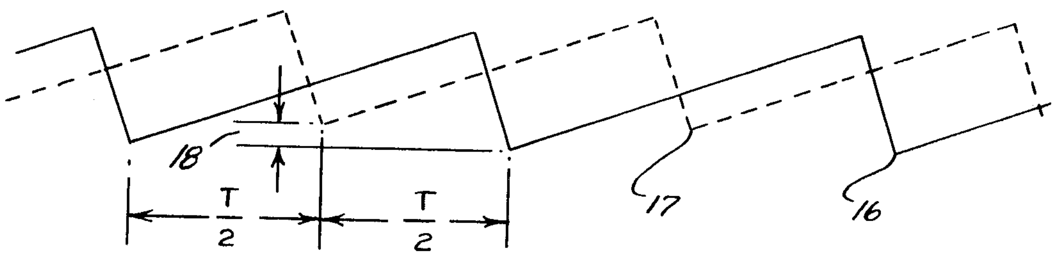
FIG. 4 shows the relationship of frame sweep deflection voltages or currents.
Figure 4A:
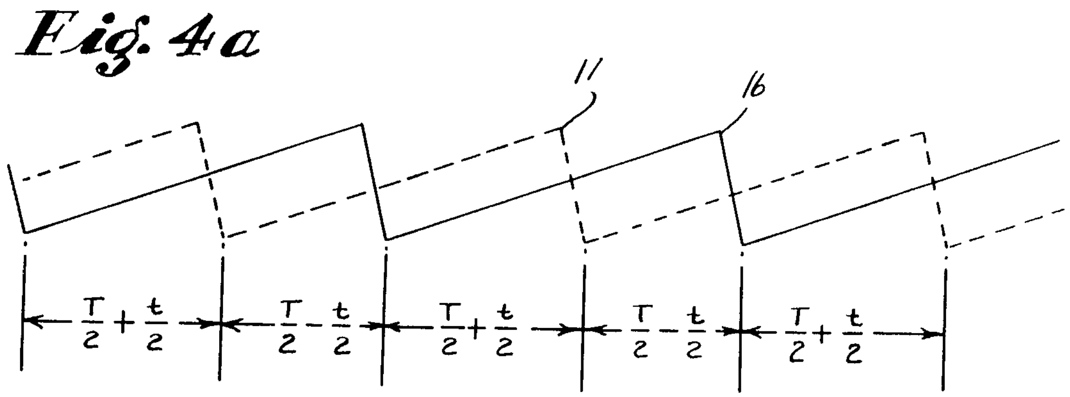
Figure 4B:
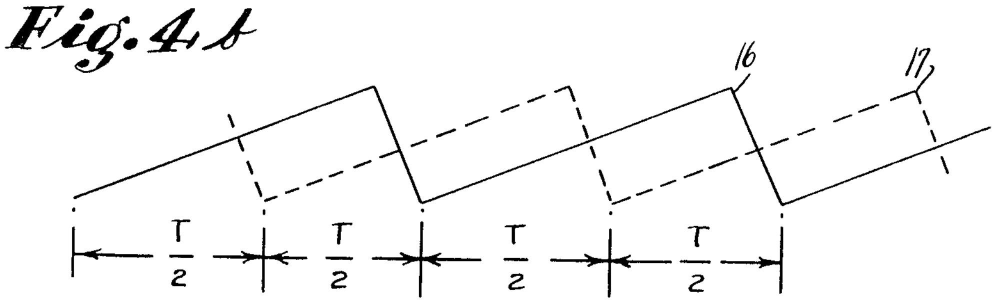

Furthermore, to prevent the two writing beams in the display tube from disturbing each other, it is desirable to have the field pulses for the two channels interlace, that is, while one channel is writing its lines in one-half of the display, the other one is writing its lines on the remaining half of the display. FIG. 4 shows an example of the time functions 16 and 17 of two field deflection voltages for an even-line system (even number of lines per field.) 16 may, for example, show the field deflection voltage that is generated by field deflection voltage generator 14, while 17 shows the field deflection voltage generated by field deflection generator 15. T is the field period of the system. The diagram shows in exaggerated form the displacement voltage as indicated in displacement voltage 18 that is needed to displace the raster of gun 11 with respect to the raster of gun 10.

Instead of using a frame/field pattern as shown in FIG. 4 where the sync pulses for the frame/field sweep generators are occurring at constant intervals $T/_2$ where T is the field period and where the displacement of the two rasters is achieved by a DC bias in one or both of the sweep generators 14 and 15, it is possible to use a deflection pattern as shown in FIG. *4a* if an even number of scanning lines are used. Here the time interval between two successive pulses alternates between $T/_2-t/_2$ and $T/_2+t/_2$, where $t$ is the line period. This can be effected by providing a pulse delay line in the input of one of the field sweep generators.

In case an uneven-line system (uneven number of lines per field), evenly spaced sync pulses and corresponding deflection signals as shown in FIG. *4b* (that is, essentially signal equal in amplitude) for the two scanning systems will result in an interlacing of the two displays.

The two channels could operate entirely independently as far as their field start is concerned if this should be desirable.

As mentioned before, it is possible to increase the number of channels by using more that two guns in the display tube and thereby reduce the required band width of the video amplifier or increase the effective resolution of the system. While FIG. 3 shows a single line sweep generator 13 and line sweep deflection means in tube 9 by way of example, a plurality may be provided if required in a particular system.

The magnitude and rate of change of the field sweep voltages developed in 14 and 15 may be controlled by respective slope control generators. These are described in detail in my copending U.S. application, Ser. No. 733,036, filed May 29, 1968. They are used to eliminate distortion in the video information displayed in tube 9. This is accomplished by applying control voltages to the field sweep generators 14 and 15 and if desired also to the line sweep generator 13 which compensate for any nonlinearities in the cameras, display tube, and/or other components. Sweep generator circuits suitable for use in this invention are described in my above mentioned copending application.

FIG. 5 shows one example of a practical embodiment of the invention. FIG. 5 is similar to FIG. 3, but shows this feature of my invention in detail. In the embodiment of FIG. 5, separate line sweep generators 13, 13*a*, and 13*b* are connected by the lines shown to provide line sweep voltages for tube 9 and cameras 3 and 4. While only one line deflection element 9*a* is shown in tube 9, by way of example, a separate line deflection element for each gun in tube 9 could be used if required in a particular application.

Each line sweep generator is connected to a respective slope control generator 130, 130*a* and 130*b*. Two field sweep generators 14 and 14*a* are connected to the field deflection elements of camera 3 and field deflection element 9*b* in tube 9. In a like manner field sweep generators 15 and 15*a* are connected to camera 4 and and element 9*c* in tube 9. Respective slope control generators 140, 140*a*, 150, and 150*a* are connected to 14, 14*a*, 15, and 15*a*.

A pulse generator 12 and its separately shown dividing and distributing elements 12*a*, 12*b*, 12*c*, and 12*d* furnish control frequencies to the generators. A frequency $f_1$ (a multiple of the line frequency $f_2$) is furnished over the multibranched line labeled $f_1$ to counters in slope control generators 130, 130*a*, and 130*b*. A frequency $f_2$ obtained by dividing $f_1$ in a counter or "divider" 12*a* is furnished over line $f_2$ to sweep generators 13, 13*a*, and 13*b*, to synchronize the sweep voltages. Frequency $f_2$ also goes to the reset terminals of counters and switches in slope control generators 130, 130*a*, and 130*b*.

Frequency $f_2$ is forwarded to counter 12*d* which releases $f_5$, a multiple of the field frequency $f_4$, to counters 300 in slope control generators 140, 140*a*, 150, and 150*a*. And finally $f_2$ feeds a counter 12*b* which releases pulses of frequency $f_3$ which is twice the field frequency $f_4$. The frequency $f_3$ operates a distributor 12*c*, which may be a flip-flop, as shown. The output of 12*c* furnishes over one terminal pulses of frequency $f_4$ to synchronize field sweep generators 14, and 14*a*, and to reset counters 300 and switches in slope control generators 140 and 140*a* as well as over the other output terminal of 12*c* in a like manner pulses to synchronize field sweep generators 15, 15*a*, and reset slope control generators 150 and 150*a*. Since the pulses of the two output terminals of flip-flop 12*c* are 180° out of phase, the beams controlled by sweep generators 14 and 14*a* will sweep one part of a raster while the beams controlled by sweep generators 15 and 15*a* are sweeping another part, thus avoiding beam interference, as previously mentioned.

Field sweep generator 15 and slope control generator 150 are expanded in FIG. 5 to show details of the circuitry. Counter 300 in 150 counts at the rate of frequency $f_5$ and sequentially energizes a plurality of output terminals as the count progresses, in a manner well-known in the art. These terminals are connected to operate a respective plurality of switches 601 through 605 which connect a plurality of potentiometers 501 through 505 to a slope control line 700. Potentiometer 500 supplies a base voltage to 700 and as switches 601 through 605 are operated successively the voltages developed on potentiometers 501 through 505 are controlling the voltage on line 700. The voltage on 700 is applied to the grid of a pentode 120 in field sweep generator 15. A capacitor 110 is charged at a rate determined by the voltage on line 700, and the voltage on capacitor 110 is applied over a line C4 to the field deflection circuit of camera 4. Capacitor 110 is discharged when the sync frequency $f_4$ is applied to the grid of a triode 160, which is a part of a multivibrator-type sawtooth oscillator. Other examples of sweep voltage generators suitable for control by slope control generators are disclosed in applicant's previously mentioned copending application.

The frequency $f_1$ generated by 12 is selected to be a convenient multiple of the line-scanning rate so as to fill the counters 300 in the slope control generators associated with the line sweep generators, between line sweeps. This frequency is a function of both the line scanning rate of the system and of the accuracy desired in the slope control generators. The slope control voltage curve is generated in a succession of approximations. The output terminals of counter 300 are not necessarily evenly spaced timewise since the generation of a complex voltage curve can make unequal periods between the operation of switches such as 601 through 605 desirable, which of course would require a correspondingly higher pulse deflection rate in the pulse generator 12. For example, if a higher degree of accuracy is required in the generation of the slope control voltages, counter 300 can be supplied with a higher counting frequency and with more switches and potentiometers such as 601, 501, etc. The frequency $f_2$ is determined by the line scanning rate of the system. The frequency $f_4$ is a function of the number of lines per field, and $f_3$ and the capacity of counter divider 12*b* are selected accordingly, $f_3$ of course is equal to $2f_4$.

As an example the following combination of pulse rates could be used:

$f_1$=150,000 P/S,
$f_2$=30,000 P/S,
$f_3$=60 P/S,
$f_4$=30 P/S, and
$f_5$=150 P/S.

In this example, $f_5$ is 5 times as great as $f_4$ so that counter 300 is slope control generator 150 will count to 5 between field sweeps. However, if nonlinear operation of switches 601 through 605 is desired, the frequency $f_5$ can be increased with respect to $f_4$ by connecting counter 12*d* so as to divide $f_2$ by a smaller factor. As an illustration, if for example, $f_5$ is selected so that counter 300 will count to 20 during a field sweep, switches 601 through 605 could be connected to, say, the first, second, fifth, 17 and 20 output terminals of counter 300. This would cause the voltage on 700 to increase in uneven steps. Of course switches 601 through 605 can be connected to any terminals desired.

The system is especially suited for high-resolution requirements such as for example in wide-angle-TV systems where a large area has to be presented, for example, by use of a wide-angle-lens system in combination with a hemispherical screen or in electronic-periscope-simulation systems.

The outputs of the slope generators are individually controllable by means well known in the art to produce output amplitudes and phases that are compatible with the requirements of the driven units.

Obviously many modifications and variations of the present invention are possible in the light of the above teachings. It is therefore to be understood that within the scope of the appended claims the invention may be practiced otherwise than as specifically described.

The invention described herein may be manufactured and used by or for the Government of the United States of America for governmental purposes without the payment of any royalties thereon or therefor.

What is claimed is:

1. In a television system the improvement comprising:

a plurality of camera-pickup systems, a common display tube having a screen, a plurality of electron gun systems in said common display tube for generating a plurality of electron beams, a plurality of deflection means for causing each of said electron beams to scan across all of said screen, said deflection means including a separate independently controllable field deflection means located in said display tube for each respective electron gun in said display tube and at least one independently controllable line deflection means located in said display tube, connecting means whereby the video information developed by said cameras is forwarded to said display tube and presented on said screen, each camera being connected to a respective electron-gun system, wherein said deflection means in said tube are controlled by sweep voltages to deflect each of said plurality of electron beams in such manner that each beam scans in a respectively different part of said screen at any particular instant to thereby avoid interference, wherein said plurality of deflection means comprise a plurality of field sweep generators and a single-line sweep generator, and including a plurality of slope control generator means, one of said slope control generator means being connected to a control input of a respective one of said plurality of field sweep generators to control the voltage output of said field sweep generator to thereby compensate for any nonlinearities in said system and thereby avoid distortion of video information presented on the screen of said display tube.

2. The apparatus of claim 1 wherein said deflection means are arranged to deflect said electron beams across said screen in an interspaced pattern of scanning paths.

3. The apparatus of claim 1, and including a separate field sweep generator and a separate associated slope control generator for each camera and for each field deflection means in said display tube.

4. The apparatus of claim 3, and including a separate line sweep generator and a separate associated slope control generator for each camera and for each line deflection means in said display tube, and a separate field sweep generator and a separate associated slope control generator for each camera and for each field deflection circuit in said display tube.

* * * * *